US011954226B2

(12) United States Patent
Kofman et al.

(10) Patent No.: US 11,954,226 B2
(45) Date of Patent: Apr. 9, 2024

(54) VERIFIABLE PRIVACY PRESERVING COMPUTATION

(71) Applicant: International Business Machines Corporation, Armonk, NY (US)

(72) Inventors: Alexander Kofman, Haifa (IL); Artem Barger, Haifa (IL); Corville O. Allen, Morrisville, NC (US); Jonathan Bnayahu, Haifa (IL); Pratul Gupta, Lexington, MA (US); Yacov Manevich, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 17/403,903

(22) Filed: Aug. 17, 2021

(65) Prior Publication Data
US 2023/0056783 A1     Feb. 23, 2023

(51) Int. Cl.
*G06F 21/62*     (2013.01)
*G06F 9/455*     (2018.01)
(Continued)

(52) U.S. Cl.
CPC ...... *G06F 21/6245* (2013.01); *G06F 9/45558* (2013.01); *G06F 21/57* (2013.01);
(Continued)

(58) Field of Classification Search
CPC ...... G06F 21/6245; G06F 21/57; G06F 21/64; G06F 9/45558; G06F 9/45533;
(Continued)

(56) References Cited

U.S. PATENT DOCUMENTS

| 2018/0063092 A1 | 3/2018 | Ollikainen |
| 2019/0279206 A1* | 9/2019 | Song ................ G06F 16/1805 |

(Continued)

FOREIGN PATENT DOCUMENTS

| EP | 3522056 A1 * | 8/2019 | ............ G06F 21/53 |
| EP | 3499847 B1 * | 6/2021 | ............ G06F 21/51 |
| WO | WO-2022234324 A1 * | 11/2022 | |

OTHER PUBLICATIONS

Agrawal, Saharsh, and Karen Tu. "Enabling Verifiable Execution of Distributed Secure Enclave Platforms." (2021). (Year: 2021).*
(Continued)

*Primary Examiner* — Michael Simitoski
(74) *Attorney, Agent, or Firm* — G.E. Ehrlich Ltd.

(57) ABSTRACT

Disclosed herein are methods and systems for executing verifiable computation modules to process private data at private data owner platform, comprising obtaining a computation module having a unique identifier recorded in a distributed ledger controlled by a plurality of computing nodes, generating a key pair comprising a signing key and a verification key derived from the signing key, recording, in the distributed ledger, an execution record associating an execution instance of the computation module with the verification key, initiating the execution instance of the computation module to process a private dataset incorporated with the signing key. outputting a computation outcome, computing an execution result signature for the execution instance based on the unique identifier and the private data and the signing key, and recording the execution result signature in the distributed ledger to enable verification of the execution instance.

17 Claims, 3 Drawing Sheets

(51) Int. Cl.
  *G06F 21/57* (2013.01)
  *H04L 9/00* (2022.01)
  *H04L 9/32* (2006.01)

(52) U.S. Cl.
  CPC .. *H04L 9/3236* (2013.01); *G06F 2009/45587* (2013.01); *G06F 2009/45595* (2013.01); *H04L 9/50* (2022.05)

(58) Field of Classification Search
  CPC . G06F 2009/45587; G06F 2009/45595; H04L 9/3236; H04L 9/3247; H04L 9/50
  See application file for complete search history.

(56) References Cited

U.S. PATENT DOCUMENTS

| | | | | |
|---|---|---|---|---|
| 2019/0287105 | A1* | 9/2019 | Fedorov | G06Q 20/401 |
| 2019/0361842 | A1* | 11/2019 | Wood | H04L 9/0637 |
| 2020/0037158 | A1* | 1/2020 | Soundararajan | G06F 16/144 |
| 2020/0342092 | A1* | 10/2020 | Wei | H04L 9/3239 |
| 2021/0058233 | A1* | 2/2021 | Lee | H04L 9/3239 |
| 2021/0064784 | A1* | 3/2021 | Wei | G06F 21/602 |
| 2021/0133315 | A1 | 5/2021 | Li | |
| 2021/0273812 | A1* | 9/2021 | Hardin | H04L 9/0822 |
| 2021/0297255 | A1* | 9/2021 | Wan | H04L 63/0442 |
| 2021/0326868 | A1* | 10/2021 | Wang | H04L 9/3247 |
| 2021/0342849 | A1* | 11/2021 | Yang | H04L 63/1425 |
| 2022/0150077 | A1* | 5/2022 | Kim | H04L 9/3247 |
| 2022/0156737 | A1* | 5/2022 | Wright | G06F 16/27 |
| 2022/0318018 | A1* | 10/2022 | Allen | G06N 7/00 |
| 2022/0358189 | A1* | 11/2022 | Doiron | G06F 21/602 |
| 2022/0417026 | A1* | 12/2022 | Grover | H04L 9/3236 |
| 2023/0269093 | A1* | 8/2023 | Ben-Ari | H04L 63/166 |
| | | | | 713/175 |

OTHER PUBLICATIONS

Bowman, Mic et al. "Private Data Objects: an Overview." arXiv:1807.05686v2 (2018). Sánchez, David Cerezo. "Raziel: Private and verifiable smart contracts on blockchains." arXiv preprint arXiv:1807.09484 (2018). (Year: 2018).*

J. Eberhardt and S. Tai, "ZoKrates—Scalable Privacy-Preserving Off-Chain Computations," 2018 IEEE International Conference on Internet of Things (iThings) and IEEE Green Computing and Communications (GreenCom). Halifax, NS, Canada, 2018, pp. 1084-1091, doi: 10.1109/Cybermatics_2018.2018.00199. (Year: 2018).*

Y. Wang, J. Li, S. Zhao and F. Yu, "Hybridchain: A Novel Architecture for Confidentiality-Preserving and Performant Permissioned Blockchain Using Trusted Execution Environment," in IEEE Access, vol. 8, pp. 190652-190662, 2020, doi: 10.1109/ACCESS.2020.3031889. (Year: 2020).*

F. Zhang et al., "The Ekiden Platform for Confidentiality-Preserving, Trustworthy, and Performant Smart Contracts," in IEEE Security & Privacy, vol. 18, No. 3, pp. 17-27, May-Jun. 2020, doi: 10.1109/MSEC.2020.2976984. (Year: 2020).*

Sánchez, David Cerezo. "Raziel: Private and verifiable smart contracts on blockchains." arXiv preprint arXiv:1807.09484 (2020). (Year: 2020).*

Alibaba, "TEE-based Confidential Computing", Alibaba Cloud, Dec. 2020, 10 Pages.

Arnautov et al., "SCONE: Secure Linux Containers with Intel SGX", Proceedings of the 12th USENIX Symposium on Operating Systems Design and Implementation (OSDI '16), Nov. 2016, 17 Pages.

Gajera et al., "PriVC: Privacy Preserving Verifiable Computation", International Conference on Communication Systems & Networks (COMSNETS), May 29, 2020, 8 Pages.

N/A, "Confidential Computing: Hardware-Based Trusted Execution for Applications and Data", The Confidential Computing Consortium, Jul. 2020, 15 Pages.

Subramanyan et al. "A Formal Foundation for Secure Remote Execution of Enclaves", CCS '17, Oct. 30-Nov. 3, 2017, Dallas, TX, USA, 16 Pages.

* cited by examiner

VERIFIABLE PRIVACY PRESERVING COMPUTATION

BACKGROUND

The present invention, in some embodiments thereof, relates to processing private data and, more specifically, but not exclusively, to processing private data using verifiable computation modules in an environment of the private data owner with traceability and verifiability of the computation process.

With the ever growing and expanding use of data centric systems, platforms and services in general and big-data applications in particular, data has become one of the most important assets almost ant organization.

Data privacy has therefore become a major concern due to the essential need to ensure that shared data, for example, personal data, confidential data, sensitive data, financial data and/or the like is only used for its intended purpose.

The challenge of maintaining data privacy is dramatically increased with the need to share data between different organizations, systems, platforms and/or services where the data may be compromised and potentially maliciously used.

SUMMARY

According to a first aspect of the present invention there is provided a computer implemented method of executing verifiable computation modules to process private data at private data owner platform, comprising using one or more processors of a private data owner for:
  Obtaining a computation module having a unique identifier recorded in a distributed ledger controlled by a plurality of computing nodes each maintaining a local copy of the distributed ledger.
  Generating a key pair comprising a signing key and a verification key derived from the signing key.
  Recording, in the distributed ledger, an execution record associating an execution instance of the computation module with the verification key.
  Initiating the execution instance of the computation module to process a private dataset incorporated with the signing key.
  Outputting a computation outcome.
  Computing an execution result signature for the execution instance based on the unique identifier and the private data and the signing key.
  Recording the execution result signature in the distributed ledger to enable verification of the execution instance.

According to a second aspect of the present invention there is provided a system for executing verifiable computation modules to process private data at private data owner platform, comprising one or more processors of a private data owner. The one or more processors are configured to execute a code. The code comprising:
  Code instructions to obtain a computation module having a unique identifier recorded in a distributed ledger controlled by a plurality of computing nodes each maintaining a local copy of the distributed ledger.
  Code instructions to generate a key pair comprising a signing key and a verification key derived from the signing key.
  Code instructions to record in the distributed ledger an execution record associating an execution instance of the computation module with the verification key.
  Code instructions to initiate execution instance of the computation module to process a private dataset incorporated with the signing key.
  Code instructions to output a computation outcome.
  Code instructions to compute an execution result signature for the execution instance based on the unique identifier and the private data and the signing key.
  Code instructions to record the execution result signature in the distributed ledger to enable verification of the execution instance.

According to a third aspect of the present invention there is provided a computer program product for executing verifiable computation modules to process private data at private data owner platform, comprising a non-transitory medium storing thereon computer program instructions which, when executed by one or more hardware processors, cause the one or more hardware processors to:
  Obtain a computation module having a unique identifier recorded in a distributed ledger controlled by a plurality of computing nodes each maintaining a local copy of the distributed ledger.
  Generate a key pair comprising a signing key and a verification key derived from the signing key.
  Record in the distributed ledger an execution record associating an execution instance of the computation module with the verification key.
  Initiate execution instance of the computation module to process a private dataset incorporated with the signing key.
  Output a computation outcome.
  Compute an execution result signature for the execution instance based on the unique identifier and the private data and the signing key.
  Record the execution result signature in the distributed ledger to enable verification of the execution instance.

In a further implementation form of the first, second and/or third aspects, the computation module used to process the private dataset is verifiable based on its identification in the execution record.

In a further implementation form of the first, second and/or third aspects, the execution instance of the computation module to process the private dataset is verifiable based on the execution result signature and the verification key extracted from the execution record.

In a further implementation form of the first, second and/or third aspects, the execution instance of the computation module to process the private dataset is repeatable by one or more of the processors based on the execution result signature.

In a further implementation form of the first, second and/or third aspects, the execution result signature includes a hash value computed using the signing key over the identifier of the computation module, the private data.

In a further implementation form of the first, second and/or third aspects, the signing key is discarded after the execution instance is complete and the execution result signature is recorded in the distributed ledger.

In a further implementation form of the first, second and/or third aspects, the signing key and the verification key constitute a private-public cryptographic key pair where the signing key is a private key and the verification key is a corresponding public key derived from the signing key.

In a further implementation form of the first, second and/or third aspects, the computation module comprising one or more execution images is associated in the distributed ledger with the unique identifier and orchestration instructions. The unique identifier uniquely identifies the one or more execution images.

In a further implementation form of the first, second and/or third aspects, the unique identifier comprises a hash value computed over content of the one or more execution images.

In a further implementation form of the first, second and/or third aspects, the one or more execution images are stored in the distributed ledger.

In a further implementation form of the first, second and/or third aspects, the one or more execution images are stored in one or more repositories and are associated to with the unique identifier of the computation module recorded in the distributed ledger.

In a further implementation form of the first, second and/or third aspects, the one or more execution images are packed in one or more immutable portable containers.

In a further implementation form of the first, second and/or third aspects, the one or more immutable portable containers comprise one or more Docker containers configured to execute independently.

In a further implementation form of the first, second and/or third aspects, the one or more immutable portable containers are discarded after the execution instance complete and the execution result signature is recorded in the distributed ledger.

In a further implementation form of the first, second and/or third aspects, the computation module is controlled using a smart contract recorded in the distributed ledger.

In a further implementation form of the first, second and/or third aspects, the computation module is executed to process the private dataset in a hardware enclave configured to provide trusted execution environment (TEE).

In an optional implementation form of the first, second and/or third aspects, the execution result signature is further indicative of the hardware enclave.

In an optional implementation form of the first, second and/or third aspects, the execution result signature is generated in a second hardware enclave isolated and independent of the hardware enclave used to execute the computation module to process the private dataset.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to processing private data and, more specifically, but not exclusively, to processing private data using verifiable computation modules in an environment of the private data owner with traceability and verifiability of the computation process.

Private data owners may often need to provide one or more other stakeholders information relating to their private data, for example, personal data, sensitive data, financial data, medical data and/or the like. Specifically, the private data owners may need to provide an outcome of the private data processed using one or more logic modules, computation modules, formulations, applications, algorithms, models and/or the like, collectively designated computation modules. The computation modules may be applied, for example, to generate one or more statistics and/or analytics based on the private data, for example, average, standard deviation, variance, count, distribution and/or the like.

This may present a trust conflict between the private data owners and the other stakeholders since the private data owners may be reluctant to share their private data and may rather prefer to process the private typically within their own controlled and secure environment which is naturally inaccessible to the other stakeholders which may be therefore unable to monitor the computation process and ensure it is properly conducted. For example, in value-based agreements, the monetary value of funds paid by a client to a provider may depend on computations done by the provider based on data private to the provider and/or vice versa, the money value that the client has to pay the provider may depend on computations done by the client based on private data that the client may be reluctant to share. For example, an insurance company may need to pay a healthcare provider (e.g. hospital, clinic, physician, laboratory, etc.), a pharma company and/or the like a sum of money which is based on computations done by the healthcare provider using its private data. Since the computation is defined by one party, i.e., the insurance company while the private data is owned by the other party, namely the health provider, there is an inherent trust problem.

According to some embodiments of the present invention, there are provided methods, systems and computer program products to enable traceability and verifiability of computation modules applied to process private data in the environment of the private data owner while supporting full traceability and verifiability of the computation process.

In particular, a distributed ledger, for example, a blockchain and/or the like controlled and updated by a plurality of computing nodes each maintaining its local ledger copy is used to establish a reliable, immutable and irreversible infrastructure for traceability, verifiability and even repetition of execution instances in which computation modules are applied to process private datasets in a private execution and processing environment of the private data owners.

A plurality of computation modules available to the private data owners may be each recorded (logged) in the distributed ledger such that each computation module may be verified according to its respective record.

Each of the computation modules may be typically constructed as portable execution images which may be downloaded and locally executed. Moreover, the execution images may be further packed in one or more self-contained portable containers, for example, Docker containers which may be executed with no need for any additional software modules, applications, libraries and/or the like.

Optionally, one or more of the computation modules may be further controlled in the distributed ledger using one or more smart contracts to trace version, history, validity, expiration time, orchestration information and/or the like.

One or more of the private data owners may therefore download, fetch, retrieve and/or otherwise obtain one or more of the computation modules to process one or more private datasets in the privacy of their own execution and processing environment (system, platform, etc.).

Prior to applying a downloaded computation module to process a target private dataset, the private data owner may first generate a respective execution record mapping the respective computation module to the respective execution instance and may record the execution record in the distributed ledger.

The private data owner may also create, for the respective execution instance, a respective key pair comprising a private signing key privately stored by the private data owner and a public verification key derived from the signing key that may be publicly distributed. The private data owner may include the verification key in the respective execution record such that the verification key associated with the respective execution instance may be used to verify the respective execution instance.

The private data owner may then apply the computation module to process the private dataset and output the computation outcome to one or more of the stakeholders. In particular, the private dataset may be processed by the computation module incorporated with the signing key such that the outcome of the execution may be mapped to the signing key and thus verifiable using the verification key.

Optionally, the private data owner may securely execute the computation module in a hardware enclave providing a Trusted Execution Environment (TEE) for the computation module to process the private dataset.

The private data owner may compute an execution result signature for the respective execution instance based on the identifier of the computation module and the private data. The private data owner may further sign the execution result signature using the signing key and may record (log) the execution result signature in the distributed ledger. Optionally, the execution result signature may include an indication of the hardware platform, for example, the hardware enclave used for the respective execution instance. At this time the private data owner may discard the signing key and optionally the computation module.

Optionally, the execution result signature may be securely computed in the hardware enclave. Moreover, the execution result signature may be optionally computed in a second hardware enclave isolated from the hardware enclave used to execute the computation module.

After the execution result signature is recorded in the distributed ledger, one or more verifiers, for example, a stakeholder having access to the distributed ledger may verify the respective execution instance and/or part thereof.

The verifier(s) may analyze the execution record created for each execution instance to identify the computation module used in the respective execution instance and further obtain the respective verification key generated for the respective execution instance. Since the verification key of the respective execution instance is derived from the signing key used to sign the execution result signature, the verifier(s) may then use the verification key to verify the execution result signature created for the respective execution instance thus validating that the declared execution module was actually used.

Moreover, since the private data is processed by the computation module incorporated with the signing key which is unique and valid for only the respective execution instance, the outcome of the computation may be mapped to the specific private dataset processed during the respective execution instance.

As such, the computation may be therefore repeated by the private data owner.

Using the distributed ledger to control the execution records and execution result signatures of the execution instances of computation modules applied to process private datasets may present significant advantages and benefits compared to currently existing systems and methods for private data processing.

First, some of existing solutions may typically rely on a trusted $3^{rd}$ party which may present several limitations. To start with, the $3^{rd}$ party must be trusted by both the private data owners and the stakeholders. Moreover, the private data must be transferred to the $3^{rd}$ party which may expose the private data to potential risks and/or attacks. Furthermore, the use of the $3^{rd}$ party may inflict additional costs, time and potentially increased computation resources (e.g. processing resources, storage resources, network resources, etc.) due to the need to transfer the private data. In contrast, using the distributed ledger may eliminate the need for the $3^{rd}$ party while establishing trust between private data owners and the stakeholders thus significantly reducing costs, time and/or computation resources.

Moreover, as the computation process may be repeated based on the execution result signature immutable and irreversibly stored in the distributed ledger, the private data owner may repeat the computation in case of dispute with one or more of the stakeholder(s).

Furthermore, executing the computation module to process the private dataset in the secure hardware enclave may reduce susceptibility of the private data to malicious attacks.

In addition, identifying the hardware enclave in the execution result signature may enable tracing the execution instance to the specific hardware enclave of the private data owner thus preventing potential malicious parties impersonating as the private data owner in attempt to place false and/or altered computation outcomes.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
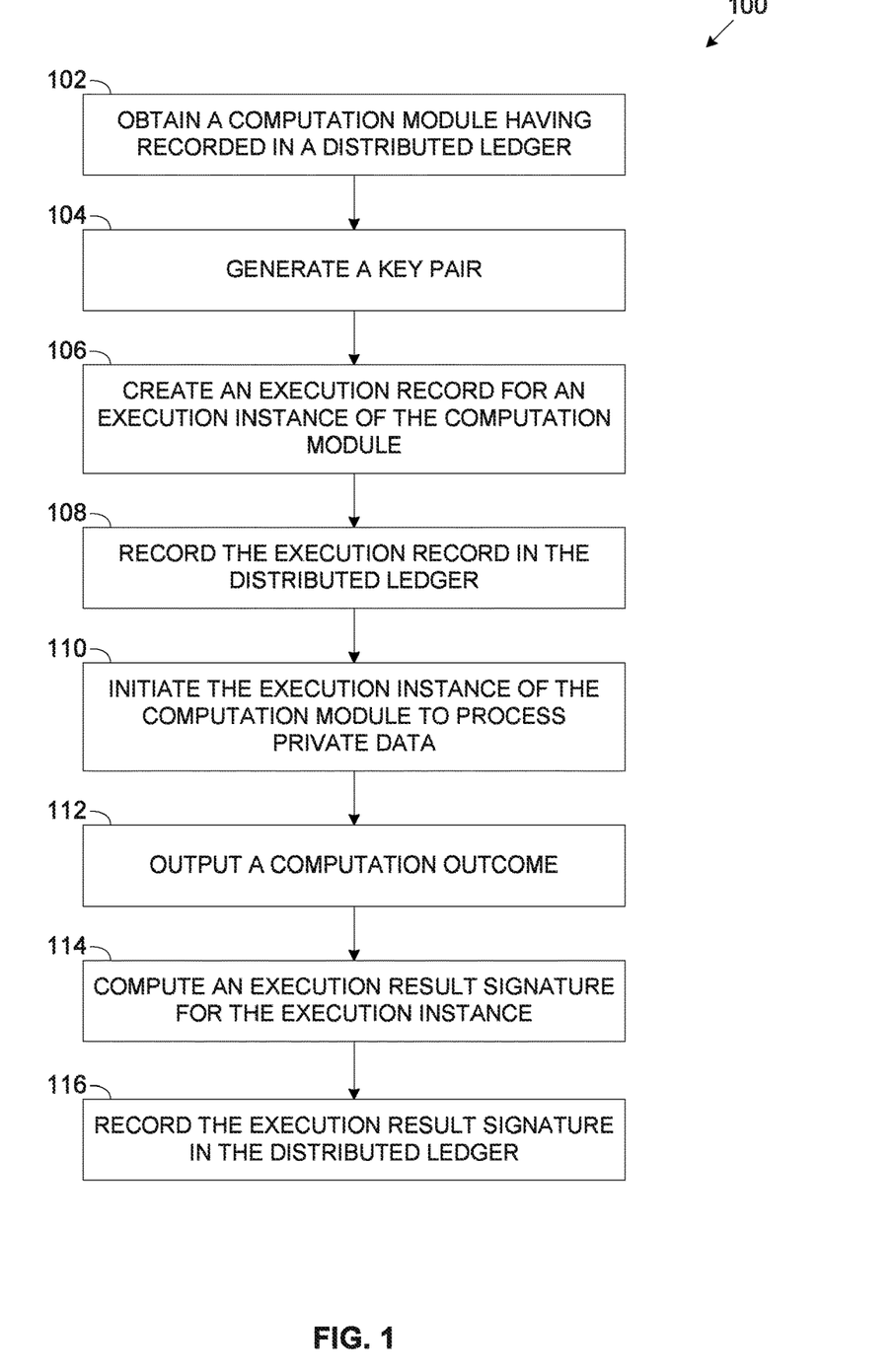
FIG. 1 is a flowchart of a method of processing private data in an environment of the private data owner using verifiable computation modules with traceability in a distributed ledger, according to some embodiments of the present invention.

Referring now to the drawings, FIG. 1 illustrates a flowchart of a method of processing private data in an environment of the private data owner using verifiable computation modules with traceability in a distributed ledger, according to some embodiments of the present invention.

An exemplary process 100 may be executed by one or more private data owners to process their private data in their own private environment (system, platform, service, etc.) using publicly available computing modules which are recorded (logged) and controlled in one or more irreversible and immutable distributed ledgers (e.g. blockchain).

Moreover, the execution of the computation modules including identification and traceability information of the private data is also recorded (logged) in the distributed ledger to enable tractability, verification and optionally re-execution of each specific computation session in which a certain private data was processed using one or more of the computation modules.

As such, private data owners may process their private data, for example, personal data, sensitive data, financial data, medical (records) data and/or the like in their own environment to ensure that the private data never leaves the data owner's environment and therefore may not be compromised to efficiently and reliably preserve security and privacy of the private data.

Figure 2A:
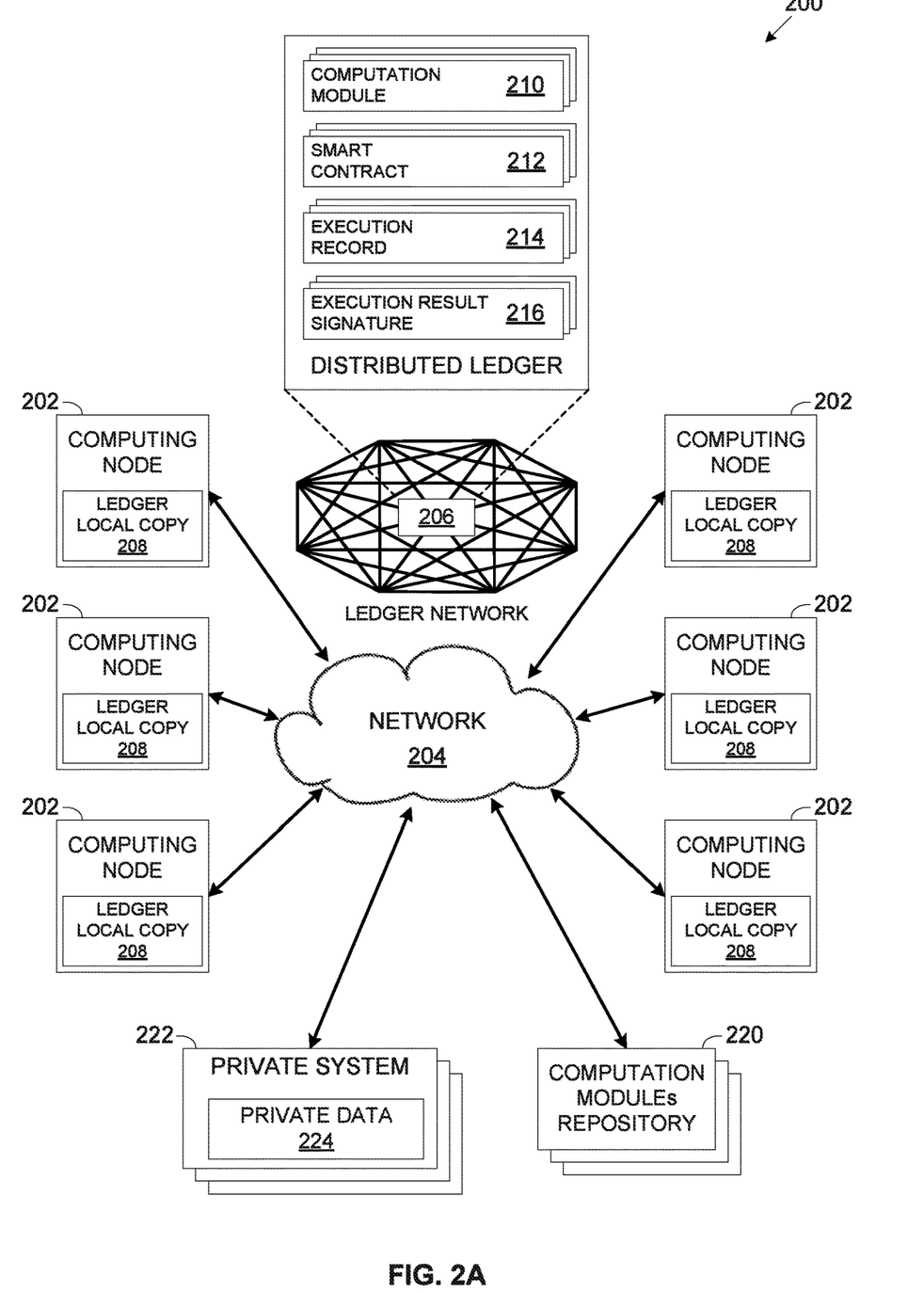
FIG. 2A and FIG. 2B are schematic illustrations of an exemplary system for processing private data in an environment of the private data owner using verifiable computation modules with traceability in a distributed ledger, according to some embodiments of the present invention.
Figure 2B:
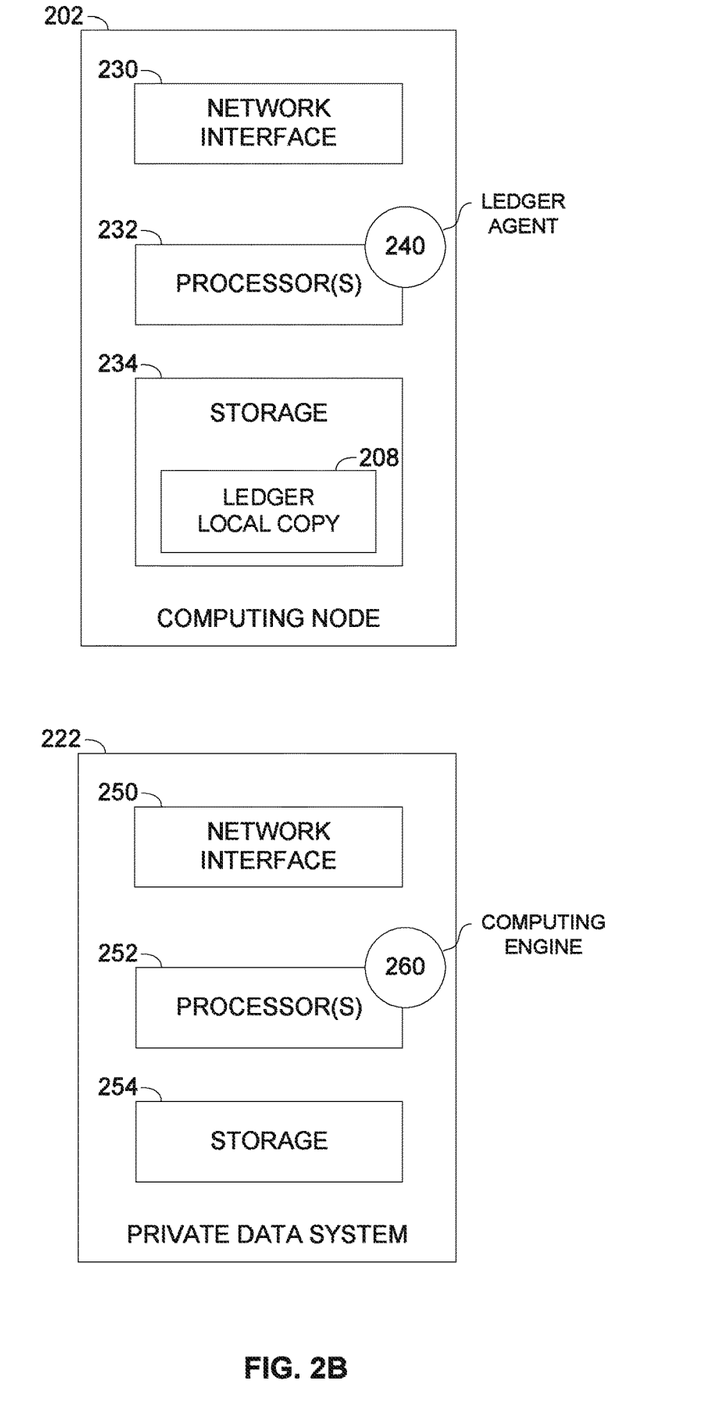

Reference is also made to FIG. 2A and FIG. 2B, which are schematic illustrations of an exemplary system for processing private data in an environment of the private data owner using verifiable computation modules with traceability in a distributed ledger, according to some embodiments of the present invention.

An exemplary environment 200 may include a distributed ledger community (network) comprising a plurality of computing nodes 202 typically untrusted by each other which may apply one or more distributed ledger (blockchain) protocols as known in the art to control a distributed ledger 206, for example, a blockchain and jointly ensure security, irreversibility and immutability of the distributed ledger 206.

The plurality of computing nodes 202, for example, a computer, a server, a processing node, a network node, a cloud computing resource, a Smartphone, a tablet and/or any device having one or more processing units may communicate with each other via a network 204 comprising one or more wired and/or wireless networks, for example, a Local Area Network (LAN), a Wireless LAN (WLAN), a Wide Area Network (WAN), a Municipal Area Network (MAN), a cellular network, the internet and/or the like.

Each of the computing nodes 202 may include a network interface 230 for connecting to the network 204, a processor(s) 232 for controlling the distributed ledger 206 and a storage 234 for storing data and/or code (program store).

The network interface 210 may include one or more wired and/or wireless network interfaces, for example, a LAN interface, a WAN interface, a MAN interface, a WLAN (e.g., Wi-Fi) interface, a cellular interface and/or the like for connecting to the network 204.

The processor(s) 232, homogenous or heterogeneous, may include one or more processing nodes arranged for parallel processing, as clusters and/or as one or more multi core processor(s). The storage 234 may include one or more non-transitory persistent (non-volatile) memory devices, for example, a ROM, a Flash array, a hard drive, an SSD, a magnetic disk and/or the like. The storage 234 may also include one or more volatile memory devices, for example, a RAM, a cache and/or the like. The storage 234 may further comprise one or more network storage resources, for example, a storage server, a Network Accessible Storage (NAS), a network drive, a cloud storage and/or the like accessible via the network interface 230.

The processor(s) 232 may execute one or more software modules such as, for example, a process, a script, an application, an agent, a utility, a tool, an Operating System (OS) and/or the like each comprising a plurality of program instructions stored in a non-transitory medium (program store) such as the storage 234 and executed by one or more processors such as the processor(s) 232. The processor(s) 232 of one or more of the computing nodes 2302 may optionally integrate, utilize and/or facilitate one or more hardware elements (modules) integrated, utilized and/or otherwise available in the respective computing node 202 202, for example, a circuit, a component, an Integrated Circuit (IC), an Application Specific Integrated Circuit (ASIC), a Field Programmable Gate Array (FPGA), a Digital Signals Processor (DSP), a Graphical Processing Unit (GPU), an Artificial Intelligence (AI) accelerator and/or the like.

The processor(s) 232 may therefore execute one or more functional modules implemented using one or more software modules, one or more of the hardware modules and/or combination thereof, for example, a ledger agent 240 configured to execute one or more distributed ledger protocols, for example, one or more blockchain protocols as known in the art to create immutable and irreversible blocks of the blockchain and control, maintain and update the distributed ledger 206 accordingly.

In particular, as known in the art, the plurality of computing nodes 202 of the community (ledger network) may jointly control the distributed ledger 206 by each computing node 202 executing a respective ledger agent 240 to monitor the network 204, detect each transaction relating to the distributed ledger 206, synchronize blocks created to include the transactions and update accordingly a ledger local copy 208 which is a copy of the distributed ledger 206 locally stored by the respective computing node 202.

The distributed ledger 206 may be deployed, controlled and maintained to immutably and irreversibly record execution of one or more portable computation modules 210 each configured to conduct one or more computations, manipulations, processing, searching and/or the like of data according to one or more predefined formulations, algorithms, models and/or the like. Such computations may include, for example, statistical and/or analytics computations such as, for example, average, standard deviation, variance, count, distribution and/or the like.

Each of the computation modules 210 may include one or more portable execution images which may be downloaded and executed. In case a certain computation module 210 consists a plurality of execution images, the certain computation module 210 may be packed as a composite module comprising the plurality of execution images. Moreover, each such composite computation module 210 may be further associated in the distributed ledger 206 with orchestration information, for example, execution instructions, order of execution, input/output data definition and/or the like. The orchestration information may be packed in one or more artifacts associated with the respective composite computation module 210.

Optionally, each execution image of one or more of the computation modules 210 may be packed in one or more portable containers, for example, a Docker container and/or the like comprising all code elements (e.g. application, library, etc.) required for execution of the receptive computation models such that the respective execution image may be executed securely, independently and isolated from any other software modules.

In order to ensure that each of the computation modules 210 is genuine, trusted, validated and/or verified, the computation modules 210 may be recorded (logged) and immutably and irreversibly controlled in the distributed ledger 206 such that the computation modules 210 are traceable and verifiable based on their fingerprints recorded in the distributed ledger 206.

In particular, metadata created for each of the computation modules 210 to deterministically identify and ensure content integrity of each of the execution images(s) of the respective computation module 210 may be reliably, immutably and irreversibly stored in the distributed ledger 206. The metadata of each computation module 210 may therefore include, for example, an identifier uniquely identifying each execution image of the computation module 210 and ensuring its content integrity.

The identifier may be generated to identify each execution image using one or more methods as known in the art. For example, one or more hash functions may be applied to the content of the respective execution image to produce a respective hash value which deterministically and uniquely identifies the respective execution image and reflects its exact content.

One or more of the computation modules 210, specifically their execution images may be stored in the distributed ledger 206 in association with their metadata. For example, the metadata of each such computation module 210 may include a pointer pointing to one or more blocks in the distributed ledger 206 storing the execution image(s) of the receptive computation module 210.

However, typically one or more of the computation modules 210, and more specifically the execution images of the computation modules 210 may be stored in one or more repositories 220, for example, a storage server, a database, a cloud storage, a cloud service and/or the like. In such case the metadata of each such computation module 210 may include a link (pointer) to the repository 220 in which the execution image(s) of the respective computation module 210 is stored and may be retrieved from.

The metadata of one or more of the computation modules 210 may further include the orchestration information of the respective computation module(s) 210.

Optionally, one or more of the computation modules 210 may be controlled using one or more smart contracts 212 which may be also recorded (logged) and controlled in the distributed ledger 206. The smart contract 212 of a respective computation module 210 may define one or more execution and/or control parameters of the respective computation module 210, for example, an identifier, a pointer (link), a version, a version history, an expiration time, the orchestration information and/or the like.

The computation modules 210 may be retrieved and executed by one or more computing systems, platforms and/or services. In particular, one or more of the computation modules 210 may be executed by one or more private systems 222, for example, a system, a platform, a service, a cloud platform and/or the like to locally process private data 224 such that the private data 224 never leaves the private system 222 which may typically be a highly secure system. Since it never leaves the private system 222, the private data 224, for example, personal data, sensitive data, financial data, medical (records) data and/or the like may not be exposed or compromised by threats, cyberattacks and/or potential malicious actions which may be launched outside the secure private system 222 thus ensuring its security, safety and/or privacy.

The private system 222 may include a network interface 250 such as the network interface 230 for connecting to the network 204, a processor(s) 252 such as the processor(s) 232 to execute the process 100 and/or part thereof and a storage 254 such as the storage 234 for storing data and/or code (program store).

Via the network interface 250, the private system 222 may fetch one or more of the computation modules 210 and/or access the distributed ledger 206. The processor(s) 252 may execute one or more functional modules, implemented using one or more software modules, one or more of the hardware modules and/or combination thereof, for example, a computing engine 260 configured to fetch (download) and initiate one or more of the computation modules 210 to process the private data 224 in the environment of the private system 222.

One or more of the private systems 222, specifically the processor(s) 252 of these systems, may further include one or more (hardware) enclaves configured to provide a Trusted Execution Environment (TEE) to one or more software module modules executed by the processor(s) 252. The TEE may ensure that the receptive software module is executed in an isolated, guarded and protected execution environment which is inaccessible by other software modules executed by the processor(s) 252. The TEE supported by the hardware enclave may include one or more private resources which may be allocated for sole use by a single software module while inaccessible to other software modules, for example, memory regions, processor registers, cache memory regions, hardware interfaces and/or the like. The TEE may be implemented using one or more methods, architectures and/or deployments as known in the art, for example, Intel Software Guard Extensions (SGX), AMD Platform Security Processor (PSP), IBM Secure Service Container, ARM TrustZone and/or the like.

However, since the private system 222 locally processes the private data 224, there is no transparency and visibility and hence no traceability of the computation process and/or its execution parameters, conditions and/or the like, for example, which computation module(s) 210 are actually used, which version, in which order, which actions and/or features of the computation module(s) 210 are applied and/or the like.

In order to overcome this limitation, each execution of each of the computation modules 210 may be also logged in the distributed ledger 206 such that each execution instance is traceable and verifiable. Specifically, a respective execution record 214 may be created and recorded (logged) in the distributed ledger 206 before execution of each of the computation modules 210. In addition, after completion of each execution instance of each of the computation modules 210 a respective execution result signature 216 may be created and recorded in the distributed ledger 206.

The execution record 214 and the execution result signature 216 created for each execution instance of each computation module 210 may be used by one or more external entities having access to the distributed ledger 206, for example, one or more of the computing nodes 202, a non-community computing node and/or the like to verify the respective execution instance and optionally re-execute it as described herein after in detail.

The process 100 is described for a single private system 222 executing a single computation module 210. This however should not be construed as limiting, since the process 100 may be expanded and scaled to a plurality of private systems 222 each applying one or more computation modules 210 to process respective private datasets in their private environment.

As shown at 102, the process 100 starts with computing engine 260 obtaining one of the computation modules 210, designated requested computation module for brevity, to locally process a certain (target) private dataset in the environment of the private system 222.

The computing engine 260 may access the distributed ledger 206, specifically the ledger local copy 208 of one or more of the computing nodes 202 in order to download, receive, fetch and/or otherwise obtain the metadata of the requested computation module 210.

The computing engine 260 may then obtain the execution image(s) of the computation module 210 according to the pointer or link included in the metadata. For example, in case the execution image(s) of the requested computation modules 210 is stored in the distributed ledger 206, the computing engine 260 may communicate with one or more of the computing nodes 202 to obtain (download, receive, fetch, etc.) the execution image(s) from the ledger local copy 208 of the respective computing node(s) 202. In case the execution image(s) of the requested computation module 210 is stored in one or more of the repositories 220, the computing engine 260 may access the respective repository(s) 220 to obtain the execution image(s) from the respective repository(s) 220.

The computing engine 260 may further verify the integrity of the content of each execution image based on the metadata of the of the computation module 210, for example, based on the identifier.

As described herein before, the execution image(s) of the of the computation module 210 obtained by the computing engine 260 may be packed in one or more immutable portable containers such as Docker containers.

In case the computation module 210 is a composite module comprising a plurality of execution images which may be optionally packed in a plurality of Docker containers, the computation module 210 may be associated with respective orchestration information which may be stored, for example, in the metadata of the computation module 210, in a smart contract 212 of the computation module 210 and/or the like. In such case, the computing engine 260 may obtain all of the execution images of the composite computation module 210 and may further obtain the orchestration information.

As shown at 104, the computing engine 260 may generate a key pair for the execution instance in which the requested computation module 210 is applied to process the certain target private dataset.

This means that a specific key pair is generated for each execution instance in which one of the computation modules 210 is applied to process a respective private dataset such that the specific key pair is only valid for the receptive execution instance.

The key pair generated by the computing engine 260 comprises a signing key and a verification key derived from the signing key. The signing key may be kept private and secret thus available only to the computing engine 260 while the verification key may be publicly distributed for verifying data originating from the computing engine 260 which is signed using the signing.

The computing engine 260 may apply one or more methods, algorithms and/or protocols as known in the art to generate the key pair. For example, the computing engine 260 may generate a private-public cryptographic key pair comprising a private key used as the signing key and a corresponding public key used as the verification key where the public key is derived from the private key, i.e., the verification key is derived from the signing key.

As shown at 106, the computing engine 260 may create an execution record 214 for the execution instance in which the requested computation module 210 is applied to process the respective private dataset.

The execution record 214 may comprise at least an instance identifier assigned to the execution instance (e.g. an incremental index), the unique identifier (e.g. hash value) of the computation module 210 and the verification key generated for the specific execution instance. The execution record therefore associates the specific execution instance with the specific (requested) computation module 210 and the verification key of the key pair specifically generated for the specific execution instance.

As shown at 108, the computing engine 260 may record (log) the execution record 214 created for the execution instance in the distributed ledger 206 in order to publish the execution instance and make the verification key available to any party that may later which the verify the execution instance.

Since it is recorded in the distributed ledger 206, the execution record 214 may not be altered thus ensuring its immutability and irreversibility.

As shown at 110, the computing engine 260 may initiate the execution instance by executing the computation module 210, specifically the execution image(s) of the computation module 210, to process the private dataset.

In particular, the computing engine 260 may initiate the computation module 210 to process the private dataset incorporated with the signing key such that the outcome of the computation process may be uniquely and deterministically mapped to the signing key.

The computing engine 260 may initiate the execution instance of the computation module 210 by the processor(s) 252 according to respective orchestration information of the computation module 210 if such information exists. For example, in case of the composite computation module 210, the computing engine 260 may initiate the multiple execution images of the composite computation module 210 according to the orchestration information, for example, order of execution, input variables, output variables and/or the like.

Since the execution image(s) of the computation module 210 may be packed in one or more portable containers, for example, Docker containers, which may self-contain all required software modules and/or elements, the computation module 210 may be executed in the environment of the private system 222 independent of any other software modules executed by the private system 222, specifically by the processor(s) 252.

Moreover, the computing engine 260 may initiate execution of the computation module 210 in a TEE provided by a hardware enclave available and supported by the processor(s) 252 such that the computation module 210 may securely execute in isolation from any other software modules executed by the processor(s) 252.

As shown at 112, the computing engine 260 may output an outcome of the computation (processing) done by the computation module 210 over the private dataset to make the computation outcome available to one or more interested parties who may require the outcome.

The computing engine 260 may apply one or more methods to publish the computation outcome. For example, the computing engine 260 may store the computation outcome in one or more networked storage resources connected to the network 204 which are accessible for retrieval by one or more of the interested parties. In another example, the computing engine 260 may transmit the computation outcome to one or more of the interested parties via the network 204.

As shown at 114, the computing engine 260 may compute an execution result signature 216 for the execution instance based at least on the unique identifier of the computation module 210 and private dataset. For example, the computing engine 260 may compute the execution result signature 216 based on the hash value of the computation module 210 and a hash value computed for the private dataset. The execution result signature 216 may be further indicative of an identifier and/or description of the private dataset.

The computing engine 260 further use the private signing key to sign the execution result signature 216. The computing engine 260 may apply one or more methods, algorithms and/or protocols as known in the art to sign the execution result signature 216. For example, the computing engine 260 may apply one or more hash functions to compute a hash value using the signing key for the unique identifier of the computation module 210 and the content of the private dataset.

Optionally, in case the execution of the computation module 210 to process the private dataset is done in the TEE hardware enclave, the execution result signature 216 may further indicate the hardware enclave, for example, an identifier of the hardware enclave, one or more execution parameters (e.g., type of TEE, security level, etc.) applied in the hardware enclave to execute the computation module 210 and/or the like.

Moreover, the execution result signature 216 may be optionally generated (computed) in a second hardware enclave isolated and independent of the general execution environment of the processor(s) 252 and from the hardware enclave used to execute the computation module 210 in particular. Securely computing the execution result signature 216 in the TEE provided by the second hardware enclave may ensure that the execution result signature 216 may not be compromised as it is inaccessible even to the computation module 210 executed in the first hardware enclave.

As shown at 116, the computing engine 260 may record (log) the computed execution result signature 216 in the distributed ledger 206. Moreover, the computing engine 260 associates the execution result signature 216 in the distributed ledger 206 with the instance identifier of the specific execution instance.

After recording the execution result signature 216 in the distributed ledger 206, the computing engine 260 may discard the computation module 210, specifically the execution image(s) of the computation module 210, for example, the portable container(s) such as, for example, the Docker container(s).

At this time the computing engine 260 may also discard the signing key which as it valid only for the current (respective) execution instance.

After the execution result signature 216 is recorded in the distributed ledger 206, the execution instance may be verified by one or more verifying parties having access to the distributed ledger 206, for example, one or more of the computing nodes 202, one or more verification systems, one or more of the parties interested in the computation outcome and/or the like.

First, the verifying party(s) may verify that the requested computation module 210 was actually used to process the private dataset during the specific execution instance conducted within the private execution environment of the private system 222. To this end, the verifying party(s) may access the distributed ledger 206 and obtain the execution record 214 created for the execution instance and recorded in the distributed ledger 206. The verifying party(s) may identify the execution record 214 corresponding to the respective (current) execution instance based on the instance identifier associated with the corresponding execution record 214 in the distributed ledger 206. The verifying party(s) may then extract the unique identifier included in the execution record 214 and may compare between the extracted identifier and the identifier of the computation module 210 recorded in the distributed ledger 206, for example, in the metadata of the computation module 210 to verify they match.

The verifying party(s) may further extract the verification key generated for the execution instance from the execution record 214 created for the execution instance.

The verifying party(s) may access the distributed ledger 206 to obtain the execution result signature 216 created for the execution instance. Again, the verifying party(s) may identify the execution result signature 216 corresponding to the respective (current) execution instance based on the instance identifier associated with the corresponding execution result signature 216 in the distributed ledger 206.

The verifying party(s) may then use the verification key extracted from the corresponding execution record 214 to verify the corresponding execution result signature 216 thus ensuring that the actual computation module 210 was used to process the private dataset during the respective execution instance.

Moreover, as the outcome of the private dataset processed by the computation module 210 incorporated with the signing key may be mapped to the signing key, the verifying party(s), using the verification key, may further verify that the declared private dataset was actually processed during the respective execution instance.

Moreover, the computing engine 260 may be able to repeat the execution instance based on the corresponding execution result signature 216 indicative of the respective private dataset processed during the respective execution instance. For example, assuming the execution result signature 216 comprises the hash value of the private dataset and optionally the identifier and/or description of the private dataset. In such case, the computing engine 260 may extract the hash value of the private dataset from the execution result signature 216 and compare it to a hash value computed for the private dataset identified in the execution result signature 216 to verify they match.

Verifying the execution instance may enable parties having no mutual trust to establish trust with each other and may be further used to repeat execution instances in cases of disputes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant kernel filters will be developed and the scope of the terms portable container and TEE technology are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of executing verifiable computation modules to process private data at private data at private data owner platform, comprising:
    using at least one processor of a private data owner for:
        obtaining a computation module having a unique identifier recorded in a distributed ledger controlled by a plurality of computing nodes each maintaining a local copy of the distributed ledger;
        generating a key pair comprising a signing key and a verification key derived from the signing key;
        recording, in the distributed ledger, an execution record associating an execution instance of the computation module with the verification key;
        initiating the execution instance of the computation module to process a private dataset incorporated with the signing key;
        outputting a computation outcome;
        computing an execution result signature for the execution instance based on the unique identifier and the private data and signing key; and
    recording the execution result signature in the distribution ledger to enable verification of the execution instance;
        wherein the computation module used to process the private dataset is verifiable based on its identification in the execution record, and the execution instance of the computation module to process the private dataset is:
    verifiable based on the execution result signature and the verification key extracted from the execution record, and repeatable by the at least one processor based on the execution result signature.

2. The method of claim 1, wherein the signing key is discarded after the execution instance is complete and the execution result signature is recorded in the distributed ledger.

3. The method of claim 1, wherein the computation module comprising at least one execution image is associated in the distributed ledger with the unique identifier and orchestration instructions, the unique identifier uniquely identifies the at least one execution image, wherein the at least one execution image is stored in one of:
    the distributed ledger, and
    at least one repository, wherein the at least one execution image is associated with the unique identifier of the computation module which is recorded in the distributed ledger.

4. The method of claim 3, wherein the at least one execution image is packed in at least of:
    at least one immutable portable container, and
    at least one Docker container configured to execute independently.

5. The method of claim 1, wherein the computation module is executed to process the private dataset in a hardware enclave configured to provide trusted execution environment (TEE), wherein the execution result signature is further indicative of the hardware enclave.

6. The method of claim 1, wherein the computation module is controlled using a smart contract recorded in the distributed ledger.

7. A system for executing verifiable computation modules to process private data at private data owner platform, comprising:
    at least one processor of a private data owner, the at least one processor is configured to execute a code, the code comprising:

code instructions to obtain a computation module having a unique indentifier recorded in a distributed ledger controlled by a plurality of computing nodes each maintaining a local copy of the distributed ledger;

code instructions to generate a key pair comprising a signing key and a verification key derived from the signing key;

code instructions to record in the distributed ledger an execution record associating an execution instance of the computation module with the verification key;

code instruction to initiate execution instance of the computation module to process a private dataset incorporated with the signing key;

code instruction to output a computation outcome;

code instruction to compute an execution result signature for the execution instance based on the unique indentifier and the private data and the signing key; and code instructions to record the execution result signature in the distributed ledger to enable verification of the execution instance;

wherein the computation module used to process the private dataset is verifiable based on its identification in the execution record, and the execution instance of the computation module to process the private dataset is:

verifiable based on the execution result signature and the verification key extracted from the execution record, and ps repeatable by the at least one processor based on the execution result signature.

8. The system of claim 7, wherein the signing key is discarded after the execution instance is complete and the execution result signature is recorded in the distributed ledger.

9. The system of claim 7, wherein the computation module comprising at least one execution image is associated in the distributed ledger with the unique identifier and orchestration instructions, the unique identifier uniquely identifies the at least one execution image, wherein the at least one execution image is stored in one of:

the distributed ledger, and at least one repository, wherein the at least one execution image is associated with the unique identifier of the computation module which is recorded in the distributed ledger.

10. The system of claim 9, wherein the at least one execution image is packed in at least of:

at least one immutable portable container, and at least one Docker container configured to execute independently.

11. The system of claim 7, wherein the computation module is executed to process the private dataset in a hardware enclave configured to provide trusted execution environment (TEE), wherein the execution result signature is further indicative of the hardware enclave.

12. The system of claim 7, wherein the computation module is controlled using a smart contract recorded in the distributed ledger.

13. A computer program product for executing verifiable computation modules to process private data at private data owner platform, comprising a non-transitory medium storing thereon computer program instructions which, when executed by at least one hardware processor, cause the at least one hardware processor to:

obtain a computation module having a unique identifier recorded in a distributed ledger controlled by a plurality of computing nodes each maintaining a local copy of the distributed ledger;

generate a key pair comprising a signing key and a verification key derived from the signing key;

record in the distributed ledger an execution record associating an execution instance of the computation module with the verification key;

initiate execution instance of the computation module to process a private dataset incorporated with the signing key;

output a computation outcome;

compute an execution result signature for the execution instance based on the unique identifier and the private data and the signing key; and record the execution result signature in the distributed ledger to enable verification of the execution instance;

wherein the computation module used to process the private dataset is verifiable based on its identification in the execution record, and the execution instance of the computation module to process the private dataset is:

verifiable based on the execution result signature and the verification key extracted from the execution record, and repeatable by the at least one processor based on the execution result signature.

14. The computer program product of claim 13, wherein the signing key is discarded after the execution instance is complete and the execution result signature is recorded in the distributed ledger.

15. The computer program product of claim 13, wherein the computation module comprising at least one execution image is associated in the distributed ledger with the unique identifier and orchestration instructions, the unique identifier uniquely identifies the at least one execution image, wherein the at least one execution image is stored in one of:

the distributed ledger, and at least one repository, wherein the at least one execution image is associated with the unique identifier of the computation module which is recorded in the distributed ledger.

16. The computer program product of claim 15, wherein the at least one execution image is packed in at least of:

at least one immutable portable container, and at least one Docker container configured to execute independently.

17. The system of claim 13, wherein the computation module is executed to process the private dataset in a hardware enclave configured to provide trusted execution environment (TEE), wherein the execution result signature is further indicative of the hardware enclave.

* * * * *